(12) United States Patent
Mazzer

(10) Patent No.: US 8,826,803 B2
(45) Date of Patent: Sep. 9, 2014

(54) COFFEE GRINDER-DISPENSER WITH COOLING FANS

(75) Inventor: Giovanni Mazzer, Gardigiano Scorze' (IT)

(73) Assignee: Mazzer Luigi S.R.L., Gardigiano di Scorzé (IT)

( * ) Notice: Subject to any disclaimer, the term of this patent is extended or adjusted under 35 U.S.C. 154(b) by 578 days.

(21) Appl. No.: 12/458,567

(22) Filed: Jul. 15, 2009

(65) Prior Publication Data

US 2010/0011975 A1    Jan. 21, 2010

(30) Foreign Application Priority Data

Jul. 17, 2008  (IT) .............................. VE2008U0019

(51) Int. Cl.
| | |
|---|---|
| A47J 31/00 | (2006.01) |
| A47J 31/40 | (2006.01) |
| A23F 3/00 | (2006.01) |
| A23F 5/00 | (2006.01) |
| A47J 31/52 | (2006.01) |
| A47J 42/54 | (2006.01) |

(52) U.S. Cl.
CPC *A47J 42/54* (2013.01); *A47J 31/52* (2013.01); *A47J 31/401* (2013.01)
USPC .......................................... 99/280; 99/323.3

(58) Field of Classification Search
CPC .......... B26D 3/11; A47J 31/005; A47J 31/52; A47J 31/401; B02C 18/0007; H05K 7/206; F28D 1/024
USPC ................ 99/538, 279, 280, 323.3; 241/100; 165/104.34, 122
See application file for complete search history.

(56) References Cited

U.S. PATENT DOCUMENTS

| | | | | |
|---|---|---|---|---|
| 1,491,217 | A * | 4/1924 | Wear | 241/44 |
| 2,796,893 | A * | 6/1957 | Tamm | 141/100 |
| 4,489,506 | A * | 12/1984 | Brown et al. | 34/577 |
| 5,207,148 | A * | 5/1993 | Anderson et al. | 99/281 |
| 6,237,468 | B1 * | 5/2001 | Erikawa | 99/287 |
| 6,260,479 | B1 * | 7/2001 | Friedrich et al. | 99/468 |
| 6,324,770 | B2 * | 12/2001 | Moon et al. | 34/577 |
| 6,948,668 | B2 * | 9/2005 | Mazzer | 241/79 |
| 2005/0268789 | A1 * | 12/2005 | Mazzer | 99/279 |

* cited by examiner

*Primary Examiner* — Henry Yuen
*Assistant Examiner* — Hemant Mathew
(74) *Attorney, Agent, or Firm* — Themis Law

(57) ABSTRACT

A coffee grinder-dispenser comprising a base housing an electric motor, with a vertically extending rotatable shaft which is connected to a grinder located in a grinding chamber. A vessel located above the grinding chamber receives coffee beans to be ground. A closure plate allows the coffee beans to enter the grinding chamber. A conduit allows the coffee, after grinding, to be delivered to a funnel; the ground coffee passes downwardly through the funnel into a filter holder. One cooling fan faces the grinding chamber, is activated by a keypad on the funnel, and delivers air transversely across the interior of the housing. A second cooling fan is located on the vertical shaft of the electric motor. The fans are operated by a controller, located within the housing, and provide sufficient cooling air to the grinding chamber to maintain the desired qualities of taste and aroma in the ground coffee.

6 Claims, 1 Drawing Sheet

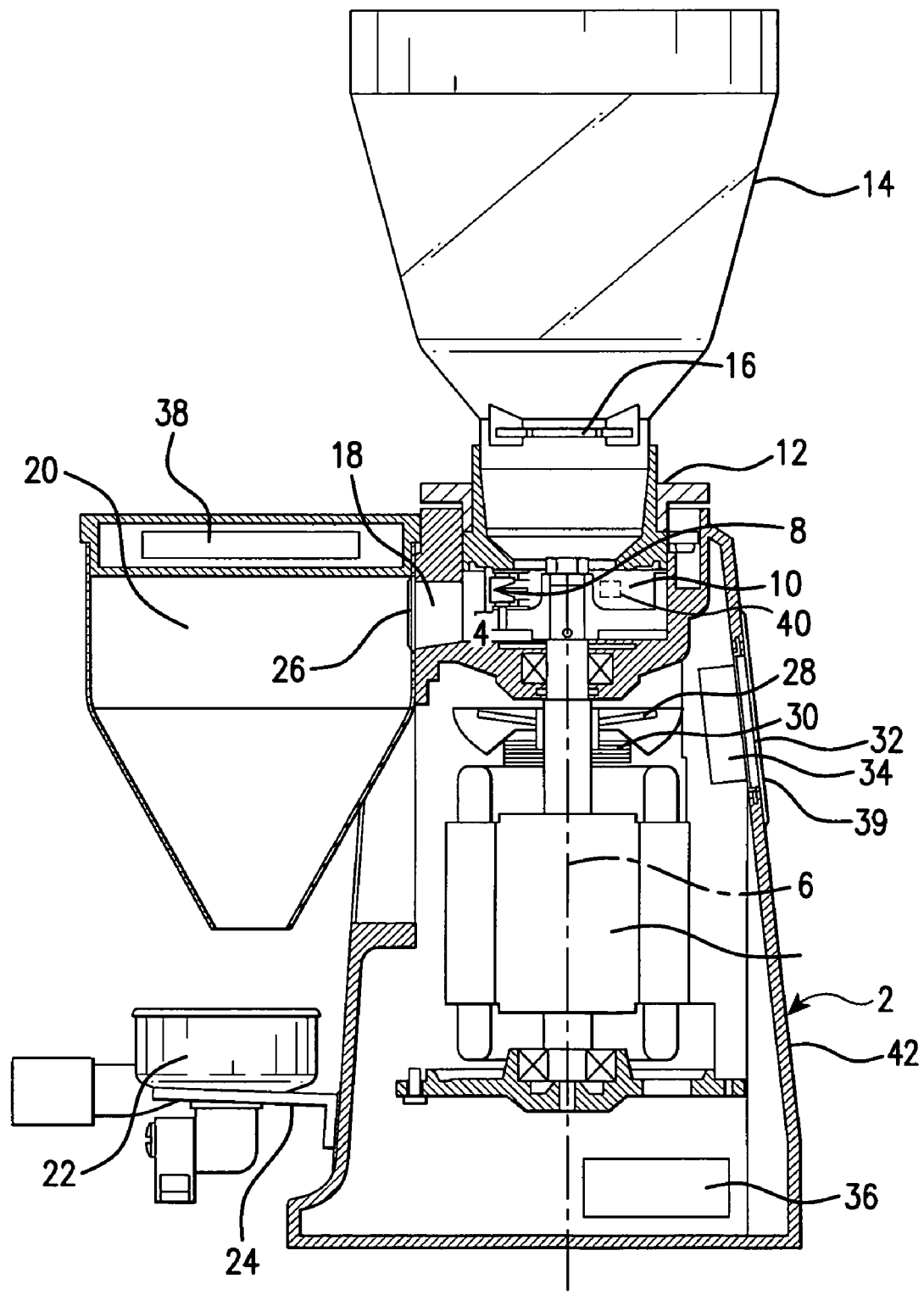

COFFEE GRINDER-DISPENSER WITH COOLING FANS

FIELD OF THE INVENTION

The present invention relates generally to a coffee grinder-dispenser, and more particularly to two cooling fans for dissipating heat build-up within the housing of the coffee grinder-dispenser that may adversely influence the taste and smell of the ground coffee.

BACKGROUND OF THE INVENTION

Coffee grinder-dispensers comprising a base housing an electric motor, with a vertically extending output shaft, connected to a grinder located within a grinding chamber, are well known. A transparent bell-shaped vessel, located at the upper end of the base, receives the coffee beans to be ground, and a closure gate regulates the flow of beans into the grinding chamber. After grinding, the ground coffee, or powder, passes through a conduit, in the housing, into the upper end of a funnel secured to the housing. A stainless steel grid is located in the conduit to reduce the velocity of the coffee powder, so that it flows smoothly through the funnel and is discharged into filters mounted therebelow on rod-like supports secured to the exterior of the housing.

A representative coffee grinder-dispenser is shown in U.S. Pat. No. 6,948,668, granted to Giovanni Mazzer on Sep. 27, 2005. The patentee, and the applicant, are the same person. The overall configuration of the known coffee grinder-dispenser is shown in FIG. 2 of the Mazzer patent, which depicts a base (2), an electric motor (4), a vertically extending output shaft (6) projecting upwardly form the motor and secured to the grinder (8) to power same. Cup (10) retains a supply of coffee beans, and closure gate (12) regulates the passage of the coffee beans into the grinding chamber to be ground by grinder (8).

The heat from the relatively large electric motor is not readily dissipated within the confines of the base, and the heat rising from the electric motor adversely impacts upon the organoleptic characteristics of the ground coffee, such as taste and smell. The Mazzer patent does not recognize this problem, and makes no effort to overcome same.

One proposed solution is to secure a cooling fan to the vertically extending output shaft from the motor. The cooling fan thus cools the coffee during the grinding operation, when the motor powers the grinder. While the cooling fan on the vertical shaft has alleviated the heat build-up problem to some degree, the reliance upon such fan has not been completely successful, and, in some instances, has proven to be unreliable. The heat from the electric motor continues to rise upwardly within the housing and negatively impact upon the ground coffee, after the grinding operation has been terminated.

BRIEF SUMMARY OF THE INVENTION

Consequently, with the disadvantages of known coffee grinder-dispensers clearly in mind, the invention is directed to a cooling system, relying upon a pair of strategically positioned fans, that will efficiently and effectively dissipate the heat within the base of the coffee grinder-dispenser, thereby maintaining the desired organoleptic characteristics of the ground coffee, such as excellent taste and wonderful aroma.

An object of the invention is to eliminate this drawback by providing a grinder-dispenser, with cooperating cooling fans, which enable the coffee to maintain its organoleptic characteristics.

The present invention employs two cooperating cooling fans, to achieve optimum results. One fan is situated on the vertically extending shaft of the electric motor below the grinding chamber, and provides a cooling action during the grinding operation. However, in contrast to known coffee grinder-dispenser, a second cooling fan, located in operative relationship to the grinder, provides cooling air, for an extended period of time, that exceeds the length of the grinding operation. The second fan blows air transversely across the grinder chamber.

The increased cooling capability of applicant's invention is achieved in a coffee grinder-dispenser comprising, inter alia, a base housing an electric motor, the motor driving a vertically oriented shaft that is connected to a grinder located within a grinding chamber. A container for the coffee beans to be ground is located above the grinding chamber, and a closure plate regulates the number of coffee beans admitted into the grinding chamber. The ground coffee, or powder, passes through a horizontal conduit into a funnel; the funnel, in turn, discharges the coffee powder into filters secured to the face of the grinding dispenser. One cooling fan is secured to the vertical shaft of the electric motor; a second cooling fan faces the grinding chamber and is activated, by a control system, that allows the second fan to operate for a period of time that exceeds the cycle of operation for the first fan. The control system responds to operation of a keypad located at the upper end of the funnel.

Other advantages of the cooperating cooling fans will become apparent to the skilled artisan when the ensuing specification is construed in harmony with the appended sheet of drawings.

BRIEF DESCRIPTION OF THE DRAWING

FIG. 1 is a vertical, cross-sectional view through a coffee grinder-dispenser constructed in accordance with the principles of the present invention.

DETAILED DESCRIPTION OF THE INVENTION

As can be seen from FIG. 1, the coffee grinder-dispenser of the invention comprises substantially a base shaped to provide a housing 2 that contains an electric motor 4. The output shaft 6 of the motor is rigidly connected to a grinder, indicated overall by 8, and located within a grinding chamber 10.

A fitting 12 is located at the upper end of grinding chamber 10, and a transparent plastic bell-shaped vessel 14 is inserted into fitting 12. A closure gate 16 regulates the volume of the coffee beans, retained in vessel 12, which are admitted into chamber 10.

The grinding chamber 10 is also provided with a conduit 18, which communicate with funnel 20 for conveying the ground coffee from chamber 10 to filter holder 22 supported by a suitable support 24 on the lower face of housing 2.

A metal grid 26, of stainless steel, is applied to the funnel entry facing the conduit 18 to reduce the speed at which the coffee is forced into the funnel. Consequently, the ground coffee, or powder, does not adhere to, and/or deposit on the walls of the funnel, and can therefore fall freely into the filter holder 22.

A first, or traditional, cooling fan 28 is keyed onto the vertical output shaft 6 of electric motor 4, as described below.

The lateral surface 42 of the housing defined by base 2 includes air intake ports 30, and an elongated aperture 32 closed by an air filter 39. A second electronically operated fan 34 is located in proximity to filter 39, on the interior of base 2.

Controller 36 is connected to keypad 38, provided on the funnel, to control the grinding operation.

Advantageously, controller 36 is provided with a system for regulating the fan activation time.

The grinder-dispenser of the invention operates in the following manner.

A key on keypad 38 is pressed corresponding to the choice (one or more measures) of coffee quantity to be ground. Motor 4 then operates such that the coffee beans, which fall from the bell-shaped vessel 14, enter the grinding chamber 10, are ground into a powder which is then fed to the funnel 20, to then fall into the filter holder 22.

At the same time, the controller 36 activates the second fan 34 for a predetermined time greater than the grinding cycle for the coffee beans in grinding chamber 10.

In a modified embodiment, a temperature sensor 40 could be positioned at the grinding chamber to cause the controller to activate fan 34 in response to predetermined temperature conditions.

Other modifications and refinements will occur to the skilled artisan in the field of coffee grinder-dispensers and similar appliances. Consequently, the appended claims should be liberally construed in a manner consistent with the spirit and scope of applicant's invention. The appended claims should not be limited to their literal terms.

I claim:

1. A coffee grinder-dispenser comprising:
    a base shaped to provide a housing, said housing having a lateral surface;
    an electric motor located within said base;
    an output shaft projecting upwardly from said motor;
    a grinding chamber located within said base;
    a grinder located within said grinding chamber, said grinder being connected to said output shaft;
    a container secured to an upper end of said base, said container adapted to receive coffee beans to be ground;
    a funnel secured to an exterior of said base;
    a conduit extending from said grinding chamber to said funnel to allow discharge of ground coffee into said funnel;
    a first cooling fan secured to said output shaft to blow air upwardly toward said grinding chamber;
    a second cooling fan directly connected to said lateral surface within said base for blowing air crosswise within said base and into contact with said grinding chamber, said second cooling fan being positioned in proximity of an aperture defined in said lateral surface of said base; and
    a controller for said second cooling fan causing said second cooling fan to run for a time longer than a grinding cycle of said coffee grinder-dispenser, such to cool said ground coffee,
    wherein said first and second cooling fans cooperate to cool the grinding chamber and contents of the grinding chamber, so that heat from said electric motor does not adversely effect the contents of the grinding chamber.

2. The coffee grinder-dispenser of claim 1, further comprising a keypad located at an upper end of said funnel.

3. The coffee grinder-dispenser of claim 2, wherein depression of a button on said keypad activates said controller, said controller being located within said base.

4. The coffee grinder-dispenser of claim 1, further comprising an air intake port provided within said lateral surface of said base.

5. The coffee grinder-dispenser of claim 1, further comprising a temperature sensor positioned in proximity of said grinding chamber, the controller being configured to activate the second cooling fan which substantially faces said grinding chamber upon an input from said temperature sensor.

6. The coffee grinder-dispenser of claim 1, wherein a filter extends across said aperture.

* * * * *